United States Patent
Einöder

[11] Patent Number: 6,029,821
[45] Date of Patent: Feb. 29, 2000

[54] SCREENING DEVICE

[75] Inventor: Norbert Einöder, Maxhütte-Haidhof, Germany

[73] Assignee: Heinrich Fiedler GmbH & Co. KG, Regensburg, Germany

[21] Appl. No.: 09/038,671

[22] Filed: Mar. 5, 1998

Related U.S. Application Data

[63] Continuation of application No. PCT/EP96/04174, Sep. 24, 1996.

[30] Foreign Application Priority Data

Sep. 25, 1995 [DE] Germany ............................ 195 35 619

[51] Int. Cl.⁷ ...................................................... B07B 1/20
[52] U.S. Cl. ......................... 209/306; 209/273; 209/385; 210/396; 210/415
[58] Field of Search ................................ 209/273, 274, 209/281, 283, 379, 380, 385, 389, 305, 306; 210/396, 407, 413, 414, 415

[56] References Cited

U.S. PATENT DOCUMENTS

| | | | |
|---|---|---|---|
| 3,909,400 | 9/1975 | Seifert | 209/273 X |
| 4,178,246 | 12/1979 | Klein | 209/306 X |
| 5,152,891 | 10/1992 | Netkowicz et al. | 210/415 X |
| 5,385,240 | 1/1995 | Egan, III et al. | 209/273 |
| 5,527,462 | 6/1996 | Davis et al. | 209/273 X |

FOREIGN PATENT DOCUMENTS

| | | |
|---|---|---|
| 0 036 328 | 9/1981 | European Pat. Off. . |
| 0 487 224 | 5/1992 | European Pat. Off. . |
| 92/11410 | 7/1992 | WIPO . |

*Primary Examiner*—Tuan N. Nguyen
*Attorney, Agent, or Firm*—Henry M. Feiereisen

[57] ABSTRACT

A screening device is described which is adapted in particular for fiber suspensions when paper is pulped. Along the outer circumference of a rotor body, there are disposed vanes which are oriented towards a screen wall. The vane is supported by a support member made of several parts, e.g. two parts, namely of a vane carrier and a strut carrier. The strut carrier is secured to the rotor body, for example by welding. The vane carrier and the strut carrier are detachably connected with each other by a screw connection which prevents rotation therebetween. More particularly, the connection between the vane carrier and the strut carrier is of the interlocking type.

15 Claims, 2 Drawing Sheets

SCREENING DEVICE

CROSS-REFERENCES TO RELATED APPLICATIONS

This application is a continuation of prior filed pending PCT international application, Appl. No. PCT/EP96/04174, filed Sep. 24, 1996.

BACKGROUND OF THE INVENTION

The present invention relates to a screening device, especially for fiber suspensions during pulping.

U.S. Pat. No. 3,909,400 describes a screening device of this type which includes a rotor body with vanes positioned along the outer circumference of the rotor body and oriented towards a screen wall which encloses the rotor body. These vanes are also referred to as sorting vanes or cleaning elements; they form, in cooperation with the screen wall, successively a suction and pressure zone in the material flow region. The respective vanes are secured with threaded rods which are rigidly affixed to one end to the vanes, while the other end of the threaded rods is attached to the rotor body via a screwed connection employing a nut and a lock-nut. Each vane is supported by two threaded rods to prevent the vanes from rotating relative to the rotor body during the operation of the screening device. The threaded connection provides an adjustment capability so that the vanes can be properly positioned. This type of support requires at least two threaded rods, thereby increasing the flow resistance and requiring a relative large electric current, and therefore a large amount of energy, for turning the rotor. Moreover, the carrier construction requires two threaded rods to exactly adjust the desired spacing between the outside contour of the vane, requiring trained personnel to perform the adjustment. The desired position, however, can change when the threaded rods are tightened. Since in the vicinity of the nuts, the threaded rods, etc., elements with sharp edges protrude from the carrier, fiber filaments can accumulate near the support, which can cause a malfunction or at least diminish the efficiency of the screening device.

Also known is a multi-vane rotor with vane-shaped cleaning elements which are rigidly connected through welding to the rotor body via a strut. In this design, the spacing between the outside contour of the vane-shaped cleaning element and the opposing screen wall is preset when the rigid weld is prepared. Although the weld prevents the vane-shaped cleaning element from rotating even if only one strut is used-, the vane-shaped cleaning elements are expensive to replace. Moreover, the spacing between the outside contour of the vane-shaped cleaning element and the opposing screen wall can only be adjusted by removing, machining and then reinstalling the strut. Changing the spacing thus necessitates expensive and complex procedures. In addition, the weld joints are stressed, thus distorting the vane-shaped cleaning element and making the spacings irregular and variable.

European Pat. No. EP-A-0 487 224 describes a rotor which includes cleaning elements secured to rails extending parallel to the axial direction of the rotor body. The gap between the outside contour of the cleaning element and the opposing screen wall can be adjusted by loosening the screw connection and shimming with a metal strip. Not only are relatively long metal strips required whose dimensions have to be adapted to the rotor, but the rails also produce a high flow resistance, resulting in high energy consumption.

SUMMARY OF THE INVENTION

It is thus an object of the present invention to provide an improved screening device, obviating the afore-stated drawbacks.

In particular, it is an object of the present invention to provide an improved reliable and energy-saving screening device of the type described above which is also designed to require very little maintenance, and wherein the gap between the outside contour of the vane and the opposing screen wall can be easily adjusted.

These objects, and others which will become apparent hereinafter, are attained in accordance with the present invention by providing a rotor body defining an outer circumference formed with a plurality of vane assemblies, each vane assembly including a support member extending radially outward from the rotor body and carrying a vane on its rotor body distant end, and a screen wall which surrounds the rotor body, whereby each vane extends in direction toward the screen wall and is so contoured as to interact with the screen wall to form successive suction and pressure zones in an area of material flow, wherein the support member is comprised of a first carrier for receiving the vane, a strut carrier secured to the rotor body and a screwed connection extending substantially centrally and axially in the support member for detachably joining the vane carrier and the strut carrier, with the vane carrier and the strut carrier being so interconnected as to prevent a relative rotation therebetween.

In the screening device of the invention, the support member for the vane is constructed from multiple elements, i.e. at least two elements, namely a vane carrier and a strut carrier. The strut carrier is secured to the rotor body, whereas the vane carrier supporting the respective vane is detachably connected to the strut carrier and secured against rotation therewith. The device is designed for easy maintenance in that the vane carrier together with the vane can be quickly removed and replaced with a new vane carrier by simply loosening the detachable connection between the vane carrier and the strut carrier. Because the respective vane is secured against rotation by only one strut, the flow resistance of the support is reduced so that the screening device of the invention can operate energy-efficiently. Because the vane carrier and the strut carrier are detachably connected, the gap spacing and the spacing between the outside contour of the vane and the opposing screen wall can be adjusted easily and effectively, whereby these tasks can be performed by the customer, without the need for trained and experienced personnel. The problems caused by fiber filaments on the carrier are also reduced, so that the screening device of the invention operates reliably. Moreover, distortions at a weld joint which may exist between the strut carrier and the rotor body, can be offset through appropriate spacers, so that the vanes can not only be attached to the rotor body with a preselected and adjustable spacing relative to the opposing screen wall, but this spacing can also be changed in regular increments.

The detachable connection is preferably in the form of a screw connection which extends essentially axially in the center of the respective carriers. The detachable screw connection is thus not directly exposed to the material flow and can therefore be easily loosened even after extended operating times of the screening device. On the other hand, the screw connection does not generate fiber filaments which can cause the screening device to malfunction. With this design for the detachable connection, the two respective carrier elements and the rotor body to be rigidly connected to each other.

Preferably, an form-fitting joint is provided between the respective carrier elements to prevent rotation therebetween. This form-fitting joint can be formed by a polygonal, in particular quadrilateral, rectangular or triangular cross-section of the respective carrier elements to be connected. The corresponding cross-sections preferably intermesh at the connection point between the vane carrier and the strut carrier, thereby forming the formfitting connection for preventing rotation.

Alternatively, the formfitting connection can be formed by alignment pins engaging in complementary receiving bores. Feasible are also combinations of different types of formfitting connections. Rotation between the carrier elements can be prevented through a proper design of the carrier elements which are to be connected with each other, so that no additional measures are required.

In a preferred embodiment, the spacing between the outside contour of the vane and the opposing screen wall, or the gap spacing, is adjustable. The vanes can then advantageously be set to the desired spacing which can be adjusted further at a later time. If subsequent adjustments are required on location, these adjustments can easily be performed by the user. Because the spacing between the outside contour of the vane and the opposing screen wall is adjustable, the device can easily be adapted to various other situations and applications.

For adjusting the spacing, spacers, in particular washers, are preferably placed between the carrier elements which are to be connected, so that the carrier elements are held captive and no fiber filaments are generated. The spacers perform quite effectively and reliably, in particular at the interface between the two carrier elements to be connected.

In a preferred embodiment of the invention, the formfitting joint is formed by a projecting journal on the vane carrier and a corresponding receptacle on the strut carrier. The journal and the receptacle have the corresponding interlocking cross-sections described above so that a formfitting joint is created when the journal engages the receptacle, which reliably prevents the two carrier members from rotating relative to each other. The washers which provide adjustment of the spacing between the outside contour of the vane and the opposing screen wall, surround the projecting journal and are retained thereon. The washers are thus held captive.

The cross section of the vane carrier and/or the strut carrier can be freely selected. Preferably, however, the cross section is round or polygonal, preferably quadrilateral or rectangular.

To make the screw connection between the two carrier elements rigid, reliable and secure, the screw connection preferably comprises a screw bolt which is slightly recessed with respect to the outside contour of the vane and which extends through the vane carrier and is screwed into a thread disposed in the strut carrier. With this design, the screw bolt extends through the vane and the vane carrier, particularly through the center of the vane carrier, with some play, wherein the connection is tightened by screwing the screw bolt into the thread in the strut carrier. This thread is preferably a female thread.

The strut carrier is preferably secured to the rotor body by welding. This provides a reliable and stable connection between the strut carrier and the rotor body. The adjustment for the screen gap spacing and the mechanism for preventing rotation between the two carrier elements are located next the carrier element interface. This advantageously also facilitates assembly.

To facilitate the manufacturing process, the vane in the form of a vane element is preferably welded to the vane carrier. The vane element is then connected to the vane carrier in a rigid and predetermined manner, similar to the rotor body.

The entire support for the vane is thus stable and unyielding and uses only a small number of components. The effective area of these components projecting into the material flow region is very small; in addition, reliable adjustments and changes in the gap spacing are possible, while the carrier elements are prevented from rotating relative to each other. The carrier element supporting the respective vane can also be replaced easily, quickly and simply, for example, during regular maintenance work. The multi-part design of the vane support permits almost unlimited adjustment of the radial projection of the vane over the outer circumference of the rotor body, so that this projection can be adapted to the respective conditions. The spacers which in the present invention have the form of washers, are essentially independent of the specific design of the strut and vane carriers and can thus be prefabricated cost-effectively and inserted in the required quantity as needed. Changes can be implemented easily, even at a later time.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
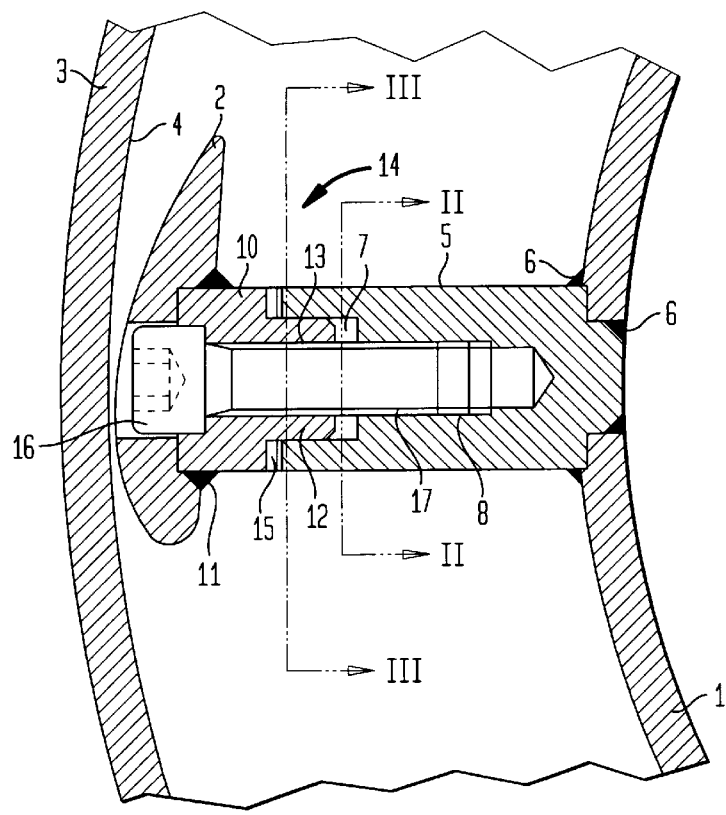
FIG. 1 is a schematic partial cross-sectional view of a screening device according to the present invention, provided with a rotor enclosed by a screen.

Throughout all the Figures, the same or corresponding elements are always indicated by the same reference numerals. Details of the screening device not shown in the drawing are of conventional design and are hereinafter neither illustrated nor described in detail.

Figure 2:
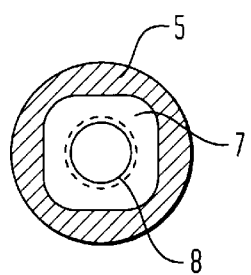
FIG. 2 is a sectional view of the screening device taken along the line II—II of FIG. 1.
Figure 3:
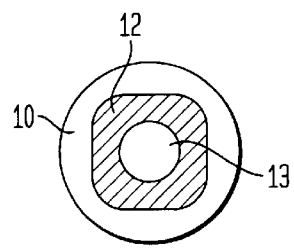
FIG. 3 is a sectional view of the screening device taken along the line III—III of FIG. 1.

Turning now to the drawing, and in particular to FIGS. 1 to 3, there is described in detail a first embodiment of the invention. Designated by reference numeral 1 is a section of the rotor body which can be in the form of a cylinder, for example a hollow cylinder. The rotor body 1 can have several vanes 2 operating as cleaning elements or as sorting elements. The vanes 2 can be arranged along the outer circumference of the rotor body 1 in a conventional manner. For sake of simplicity, only one support element of a single vane 2 will be described. It is understood that the remaining vanes 2 can be secured to the rotor body 1 in the same or in a similar manner.

The rotor body 1 with the attached vanes 2 is enclosed by a screen 3, with the inside of the screen 3 forming a screen wall 4. The screen wall has, of course, perforations which are not illustrated in detail. The respective vane 2 moves across the screen wall 4 at a preset spacing which can be adjusted between, for example, 1 mm and 12 mm. This spacing can be different from one application to the next and from one sorting task to the next; consequently, the spacing should be adjustable.

The support member for the vane 2 comprises a strut carrier 5 which, as illustrated, projects radially slightly over the outside contour of the rotor body 1 and is oriented towards the screen wall 4. The strut carrier 5 extends partly through the wall of the rotor body 1 and is rigidly connected with the rotor body 1 by a welded joint indicated by the numeral 6. On the front side, i.e. on the side facing away from the rotor body, the strut carrier 5 has a recessed seat 7, which in the illustrated example has a quadrilateral contour (see FIG. 2). A female screw thread 8 extends from this seat 7 through the center of the strut carrier 5. The support member also includes a vane carrier 10 for supporting the vane element or the vane 2, respectively. The vane 2 is rigidly affixed to the vane carrier 10 by welding, as indicated for example at 11. The vane carrier 10 and the strut carrier 5 have essentially identical cross-sectional dimensions along most of their longitudinal extent. Projecting from the center of the vane carrier 10 is a journal 12 which—according to FIG. 3—has a quadrilateral cross-section which closely fits the quadrilateral contour of the seat 7. The vane carrier 10 furthermore has a through bore 13 extending axially past the internal screw thread 8 of the strut carrier 5 and also penetrating the journal 12.

As indicated schematically in FIG. 1, the spacers 14 surrounding the journal 12 are in the form of washers 15; the number of washers 15 can be suitably selected to adjust the spacing between the shoulder of the vane carrier 10 and the corresponding front face of the strut carrier 5. With the strut carrier 5 and vane carrier 10 forming a single unit, the spacing between the outside contour of the vane 2 and the opposing screen wall 4 can be properly adjusted.

A screw bolt 17 which preferably has a hexagon socket head 16, is provided for detachably securing the vane carrier 10 including the vane 2 to the strut carrier 5. In the position indicated in FIG. 1, the head 16 is set back, i.e. recessed, relative to the outside contour of the vane 2. In the embodiment of the invention, the head 16 thus does not protrude from the support of the vane 2.

The screw bolt 17 is installed by pushing the bolt 17 through the through bore 13 and by then screwing the bolt 17 into the female thread 8 of the strut carrier 5. With the appropriately contoured seat 7 and journal 12, the formfitting connection is secured against rotation, so that the vane carrier 10 cannot rotate relative to the strut carrier 5 when the screw bolt 17 is tightened. The formfitting connection can have a shape which is differently from the illustrated quadrilateral design of the journal 12 and seat 7. Preferred are, for example, polygonal, rectangular, triangular or similar embodiments.

The washers 15 can, for example, be prefabricated in bulk with thicknesses in increments of 1 mm, and then inserted as needed.

As evidenced by the preceding description, the support construction for the vane 2 is comprised of only one strut which is formed in several parts, namely in at least two parts, and includes, for example, the strut carrier 5 and the vane carrier 10. The outer circumference of the connected assembly of strut carrier 5 and vane carrier 10 has essentially no protruding elements, except for the vane 2 itself, so that fiber filaments are effectively eliminated. In addition, this design also significantly reduces the flow resistance of the support in the material flow regime, so that operating the screening device requires very little energy.

If, for example, a vane 2 is damaged or worn out, then maintenance work on the device can be performed on location quickly and easily. First, the screw bolt 17 is loosened and then removed from the strut carrier 5 together with the vane carrier 10. A completely new vane carrier 10 with vane 2 is then installed; the screw bolt 17 is again inserted and tightened, thereby finishing the maintenance work.

If it becomes necessary to change the sorting conditions by adjusting, for example, the spacing between the outside contour of the vane 2 and the screen wall 4, then this can be accomplished by loosening the screw bolt 17 and by removing or adding one or more washers 15, depending if the spacing is to be increased or decreased. The spacing can also be easily adjusted by the user and even by untrained personnel. The screening device can thus be retrofitted in a timely and cost-effective manner. The design of the invention provides for cost-effective manufacture of the individual support components for the vane 2; the vanes 2 can be secured to the rotor body 1 so that the assembly is not only easy to maintain and universally usable, but can also be fabricated cost-effectively.

Figure 4:
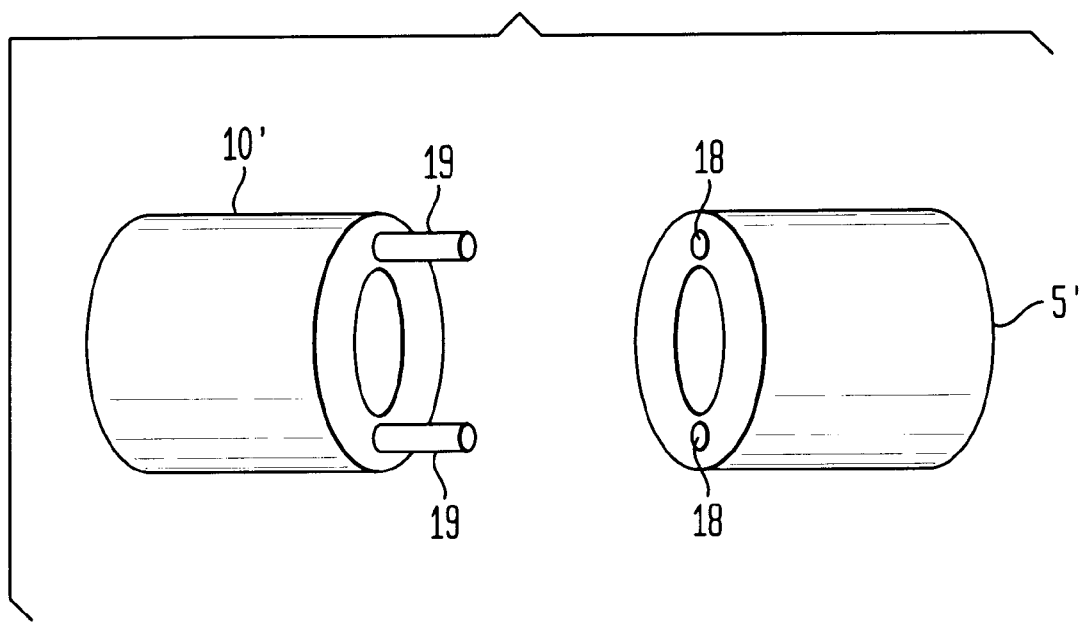
FIG. 4 is a schematic, exploded perspective view of another embodiment of a screening device according to the present invention, showing a detachable connection between the two carrier elements with a variation of an anti-rotation mechanism.

Referring now to FIG. 4, there is depicted schematically an alternative design of a two-part embodiment of a strut; rotor body and vanes have been omitted. The vane carrier supporting the vane (not shown) is designated with the reference numeral 10' and the corresponding strut carrier with the reference numeral 5'. As illustrated, on the front face of the strut carrier 5', there are provided e.g. two alignment bores 18 which are arranged, for example, in a diametrically opposed relationship. From the vane carrier 10' which is to be connected with the strut carrier 5', there are projecting two corresponding alignment pins 19 which engage the alignment bores 18 when the two carrier members 5' and 10' are connected. In all other details, the connection between these two carrier members 5' and 10' as well as between the rotor body and the vanes is similar to the connection illustrated in FIG. 1 and described above. The cooperation between the alignment bores 18 and the alignment pins 19 prevents the two carrier members which are to be connected, i.e. the vane carrier 10' and the strut carrier 5', from rotating relative to each other; the interlock is similar to that of the contoured journal 12 and seat 7. Consequently, this design also effect a form-fitting anti-rotation mechanism.

Of course, other means for preventing relative rotation can be employed by a person skilled in the art without deviating from the spirit of the invention. The invention is thus not restricted to the aforedescribed details or to similar embodiments of the support construction for the vane 2. It is important, however, that a respective vane 2 is detachably connected to the rotor body 1 via a strut-like connection wherein the vane 2 cannot rotate relative the the rotor body 1 and wherein the size of the projection can be adjusted. The strut is here subdivided into at least two separate parts, namely a strut carrier 5, 5' and a vane carrier 10, 10'.

The cross section of the vane carriers 10, 10' and of the strut carriers 5, 5' can be freely selected, and the respective carrier elements can be formed from round stock or from stock with a quadrilateral or rectangular cross section. Most importantly, however, the spacing between the outside contour of the vane 2 and the opposing screen wall 4 is adjustable with the help of spacers 14, preferably in the form of washers 15, which can be placed between the two carrier members 5, 5' and 10, 10' which are to be connected.

While the invention has been illustrated and described as embodied in a screening device, it is not intended to be limited to the details shown since various modifications and structural changes may be made without departing in any way from the spirit of the present invention.

What is claimed as new and desired to be protected by Letters Patent is set forth in the appended claims:

1. A screening device, in particular for fiber suspensions during pulping, comprising:

a rotor body defining an outer circumference formed with a plurality of vane assemblies, each vane assembly including a support member extending radially outward from the rotor body and carrying a vane having a unitary camber on its rotor body distant end;

a screen wall surrounding the rotor body, with each vane axially extending from the rotor body in direction toward the screen wall and so contoured as to interact with the screen wall to form successive suction and pressure zones in an area of material flow;

wherein the support member is comprised of a vane carrier for attachment of the vane, a strut carrier secured to the rotor body, and connection means for so detachably joining the vane carrier and the strut carrier as to prevent a relative rotation therebetween, said connection means including an adjustable screwed connection extending substantially centrally and axially in the support member whereby the spacing between the camber of the vane and the opposing screen wall is adjusted.

2. The screening device of claim 1 wherein the connection means includes a form-fitting joint between the vane carrier and the strut carrier for preventing a relative rotation therebetween.

3. The screening device of claim 2 wherein the form-fitting joint is a tongue and groove joint of polygonal cross-section.

4. The screening device of claim 3 wherein the tongue and groove joint has a cross section selected from the group consisting of quadrilateral cross section, rectangular cross section and triangular cross section.

5. The screening device of claim 3 wherein the form-fitting joint further is formed by alignment pins engaging in complementary receiving bores.

6. The screening device of claim 1, and further comprising distance-modifying means for effecting a variation in spacing between the vane and the opposing screen wall.

7. The screening device of claim 6 wherein the distance-modifying means includes a spacer disposed between the vane carrier and the strut carrier.

8. The screening device of claim 7 wherein the spacer is a washer.

9. The screening device of claim 3 wherein the form-fitting joint further is formed by a journal projecting from the vane carrier and a complementary receptacle disposed on the strut carrier.

10. The screening device of claims 9, and further comprising distance-modifying means for effecting a variation in spacing between the vane and the opposing screen wall, said distance-modifying means including a washer surrounding the projecting journal.

11. The screening device of claim 1 wherein at least one element selected from the group consisting of vane carrier and strut carrier has a cross-section selected from the group consisting of round cross section and polygonal cross section.

12. The screening device of claim 11 wherein the one element has a polygonal cross section selected from the group consisting of quadrilateral cross section and rectangular cross section.

13. The screening device of claim 1 wherein the screw connection includes a screw bolt which is recessed with respect to an outside contour of the vane and extends through the vane carrier for threaded engagement the strut carrier.

14. The screening device of claim 1 wherein the strut carrier is secured to the rotor body by welding.

15. The screening device of claim 1 wherein the vane is welded onto the vane carrier.

* * * * *